Aug. 21, 1956  R. W. JOHNSON  2,759,680
EXPANSIBLE CHUCK
Filed Feb. 26, 1954  2 Sheets-Sheet 1
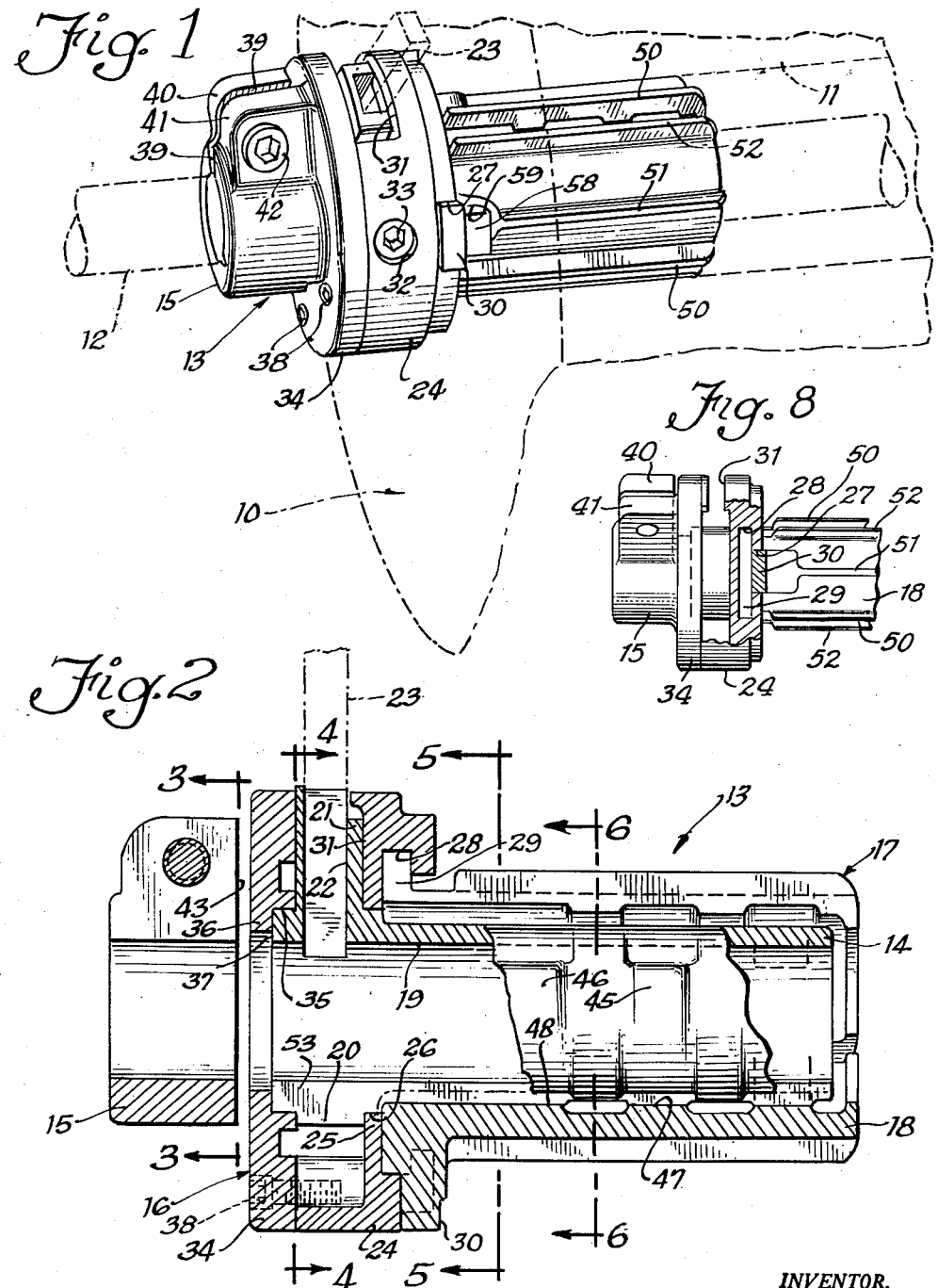
INVENTOR.
Ray W. Johnson
BY
Atty Aug. 21, 1956 — R. W. JOHNSON — 2,759,680
EXPANSIBLE CHUCK
Filed Feb. 26, 1954 — 2 Sheets-Sheet 2
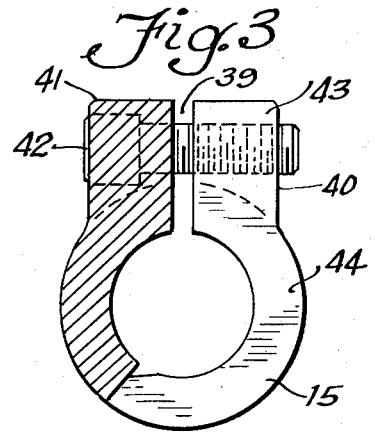
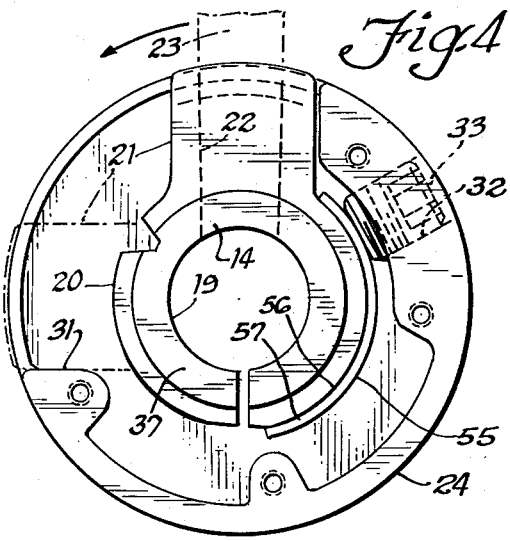
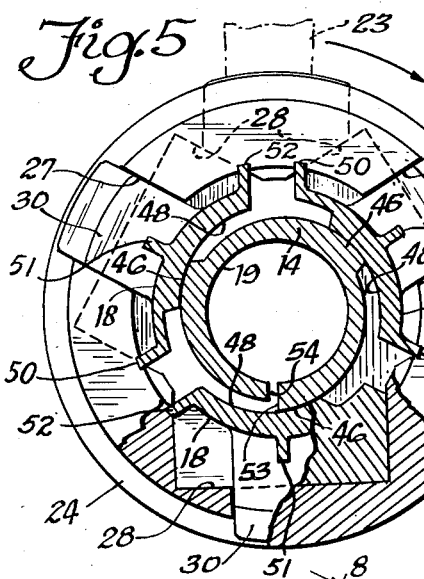
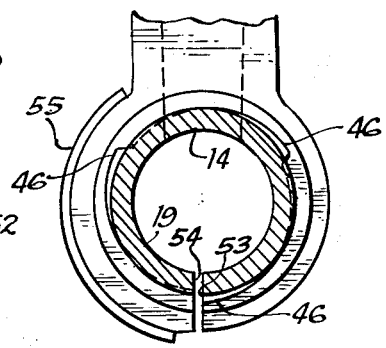
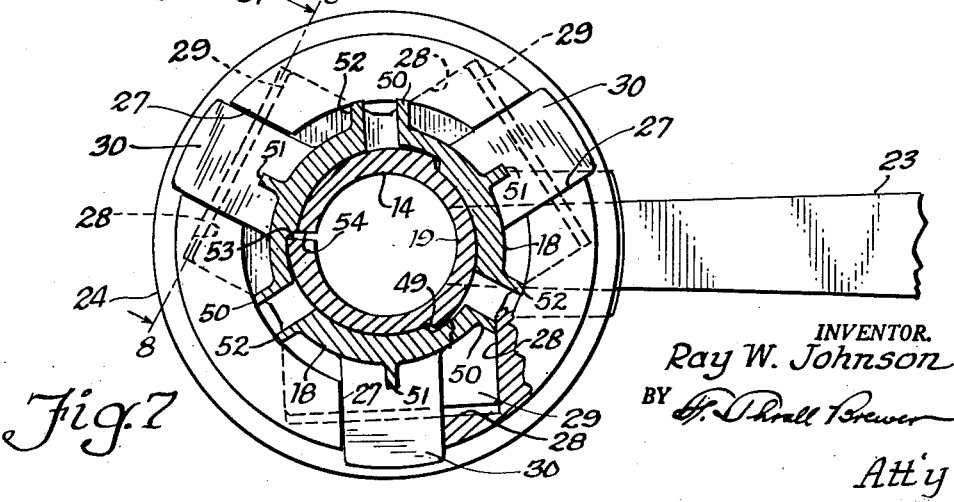
INVENTOR.
Ray W. Johnson
BY
Att'y

United States Patent Office 2,759,680
Patented Aug. 21, 1956

2,759,680

EXPANSIBLE CHUCK

Ray W. Johnson, Chicago, Ill.

Application February 26, 1954, Serial No. 412,802

9 Claims. (Cl. 242—68)

This invention relates to chucks of the expanding type and is particularly well adapted for use with a shaft for holding large and heavy rolls of paper or other materials in printing presses and in dispensers for wrapping paper or the like.

In my prior Patent No. 2,116,243, dated May 3, 1938, for a Chuck, I disclose and claim an expansible chuck having a central mandrel, a segmental sleeve surrounding the mandrel, with cam means disposed between the mandrel and sleeve and operative upon relative rotation between the mandrel and sleeve to expand the sleeve and thereby cause it to grip the interior of a roll of paper or the like. The cam means therein disclosed comprises a plurality of spirally disposed surfaces on the exterior of the mandrel cooperating with the relatively smooth cylindrical interior surfaces of the segments of the sleeve. One such set of surfaces is provided for each segment of the sleeve. In this prior construction, relative rotation of the mandrel and segmental sleeve causes the segments of the sleeve to be tilted in conformance with the spiral surface of the cams, with the result that contact between the sleeve and the inner surface of the roll is limited largely to the outermost edge of each segment rather than to a plurality of bearing points peripherally spaced about each segment.

One of the objects of this invention is the provision of an improved means for expanding a chuck of the type disclosed in my aforesaid patent wherein each segment of the sleeve is moved radially outwardly to positions which are parallel to one another rather than to positions which are extensions of a spiral, thereby to provide a more uniform distribution of gripping action upon the interior of a roll.

It has been found that chucks of the type to which this invention relates are required to be used with increasingly greater ranges of internal diameters of rolls, and that the range of expansion of a chuck is desirably made as great as possible so that a fewer number of chucks will suffice for a given range of internal roll sizes.

It is accordingly another object of this invention to provide expanding means for a chuck which will make it possible for a chuck to cover a greater range of sizes of internal diameters of rolls than was heretofore possible.

Among the more specific objects of this invention is the provision of a chuck having a relatively long mandrel wherein the expansion along the mandrel from end to end is substantially uniform.

It is also a specific object of this invention to provide an improved means for locking the chuck in any position of expansion to prevent an accidental loosening of the chuck while it is in use.

Another specific object of this invention is to provide a control head for a chuck of the type herein referred to which will provide a guide for each segment of the expanding sleeve to insure a proper location of the sleeve within a roll and a uniform holding effort exerted by the segment upon the interior of the roll.

These and other objects and features of this invention will become apparent from the following detailed description when taken together with the accompanying drawings in which:

Fig. 1 is a perspective view of an assembled chuck made in accordance with this invention and showing in dotted outlines the manner in which the chuck is applied to a roll;

Fig. 2 is an enlarged side view in section of the chuck of Fig. 1;

Fig. 3 is an elevation in section of the chuck, looking in the direction of the arrows 3—3 of Fig. 2;

Fig. 4 is an elevation in section of the chuck looking in the direction of arrows 4—4 of Fig. 2;

Fig. 5 is another elevational view in section of the chuck taken along line 5—5 of Fig. 2, showing the chuck in an expanded condition;

Fig. 6 is an elevation in section of the expanding portion of the chuck, taken along line 6—6 of Fig. 2;

Fig. 7 is an elevation in section of the chuck, similar to that shown in Fig. 5, showing the chuck in a collapsed condition; and Fig. 8 is a chordal section along line 8—8 of Fig. 5 looking in the direction of the arrows 8—8.

Referring now to the drawings for a detailed description of the invention, there is shown in Fig. 1 in dotted outlines a roll 10 which may be a roll of paper such as is used in printing presses as the source of paper supply, said roll being provided with a central opening 11 which may or may not be protected with a metal tubular liner (not shown). It is not essential for the proper functioning of this invention that such a liner be used. Roll 10 is supported in the press by a shaft 12 to which it is clamped by a pair of chucks 13 disposed one at each end of opening 11, the chucks being identical for convenience and hence but one chuck is shown in the drawings. It is understood that shaft 12 is freely rotatable about its axis in the supports (not shown) that are provided for it in the press. Because of the great weight and high speed of rotation of present day paper rolls used in printing presses, it is desirable that roll 10 be rotated as smoothly and uniformly as possible to avoid vibration and an uneven feeding of the paper into the press.

The chuck 13 of this invention is comprised of a hollow mandrel 14 adapted to encircle shaft 12, a clamping ring 15 and a chuck head 16. Surrounding mandrel 14 is a segmental sleeve 17 made, in the form illustrated, in three identical sections 18 which constitute the expanding jaws of the chuck.

Mandrel 14 is preferably made as a tubular casting having an inner cylindrical surface 19, a short radially disposed flange 20 located at the end of the mandrel which is received in head 16, and a radially outwardly extending lug 21 forming an extension of flange 20. Lug 21 may have a rectangular opening 22 cored therein, into which may be inserted the end of a bar 23 by which the chuck is operated.

Head 16 is made of two circular parts, the first part 24 having a radially inwardly extending flange 25 which rides on a shoulder 26 formed in flange 20 of mandrel 14, and having radially disposed slots 27 (Figs. 5 and 7), one for each section 18 of sleeve 17. In slots 27 ride tongues 30 formed on each section 18. Adjacent each slot 27, and on either side thereof, as shown in Figs. 2, 5 and 7, head part 24 is formed with shoulder-like recesses 28 in which are received lugs 29, preferably formed integrally with sections 18 and disposed one on either side of the radially extending tongues 30. Slots 27 are open at the bottom as seen from the right of Fig. 2 and are of greater depth than the recesses 28. Recesses 28 thus function as retaining means for holding the sections 18 in place axially in the chuck, and tongues 30, riding in slots 27, limit the movement of sections 18 to a substantially radial movement wherein the sections assume positions which are parallel to one another. The radially outer chordal surfaces of recesses 28 serve as stop means to limit radially outward movement of lugs 29 and section 18.

Part 24 is also formed with a sector shaped slot 31 (Figs. 1 and 4) in which lug 21 may be oscillated through a predetermined angle corresponding to the limits of the expansion of the chuck. Part 24 is also provided with a threaded opening 32 extending radially inwardly in communication with mandrel 14 to receive a set screw 33, as shown more clearly in Fig. 4, by which mandrel 14 may be locked to head 16 in any selected angular setting as will be described in detail hereinafter.

The other part of head 16 is comprised of a closure plate 34 having a recess 35 facing inwardly of the head and formed in part by a radially inwardly extending flange 36 which overlies the end 37 of mandrel 14. Closure plate 34 is secured to part 24 by a plurality of screws 38, one of which is shown in dotted outline in Fig. 2, and when parts 24 and 34 are so assembled, all components of head 16, including mandrel 14 and sections 18, then constitute a single unit which may be handled as such and applied to a roll 10 and mandrel 12 in the manner shown in Fig. 1.

The means for clamping head 16 to shaft 12, in the form chosen to illustrate this invention, is comprised of a ring 15 as previously referred to, said ring being preferably formed integrally with closure plate 34 and split axially at 39. A pair of opposed lugs 40, 41 on ring 15 may be drawn together by a screw 42 threaded in lug 40 and having its head bearing against a recessed side of lug 41. To provide the necessary flexibility for clamping ring 15, lug 40 is severed from closure plate 34 as shown at 43 in Fig. 3, and a part of ring 15 adjacent severed lug 40 is similarly severed, the amount being just sufficient to provide the necessary flexibility for the desired clamping action without unduly weakening the clamp and limiting its effectiveness to support roll 10 on shaft 12. The severed portion of clamping ring 15 is shown at 44 in Fig. 3.

The expansion of sleeve 17 is accomplished by the interaction of a plurality of axially spaced spiral cam surfaces 45 and 46 each extending half inwardly and half outwardly from the surface of mandrel 14, and similarly shaped cam surfaces 47 and 48 disposed on the interior surfaces of sections 18. As shown more clearly in Figs. 5 and 6, there is one cam surface 46 for each section 18, so that, there being three sections 18, there are three cam surfaces 46 arranged end-to-end around the periphery of mandrel 14. Fig. 5 shows the relative disposition of cam surfaces 46 on the mandrel and cam surfaces 48 on the sections when mandrel 14 has been rotated to expand sleeve 17. It may be observed that there is still surface-to-surface contact between cams 46 and 48, and that consequently there is ample bearing area between the sections 18 and the mandrel to support the load that may be imposed upon the sections 18. In the collapsed condition shown in Fig. 7 the mandrel 14 has been rotated clockwise until the high part of a cam surface 46 intended for one section 18 abuts the radially inwardly extending end 49 of the adjacent section 18. This position of mandrel 14 corresponds to a position of lug 21 in its angular slot 31 at the end or limit of its movement in the collapsing direction.

The exterior surface of each section 17 is preferably formed with longitudinal, substantially axially extending, ribs 50, 51 and 52. Ribs 50 and 52 are formed as extensions of the sides of the sections, and rib 51 is preferably disposed substantially midway between ribs 50 and 52. Contact between central opening 11 in roll 10 and sections 18 is thus limited to the exterior surfaces of ribs 50, 51 and 52 on each section, and, in view of the substantial decrease in the contacting area represented by the ribs of a section as compared with the total exterior area of each section, the unit pressure developed by the ribs will be considerable and hence the holding power of the chuck is greatly augmented by the ribs. Since the expansion of the chuck causes each section 18 to move parallel to itself, three-point contact between each section and the interior of the roll will occur at just one expanded position of the chuck. At all other positions, either the central rib 51, or the side ribs 50 and 52, will bear the greatest portion of the pressure exerted by the cams.

Thus, if the chuck is expanded beyond the position wherein contact is equally distributed between ribs 50, 51 and 52, greater pressure will be exerted by rim 51 than by ribs 50 and 52. It may be observed, however, that under these circumstances the high part of the cam 46 of the mandrel is substantially under the rib 51 as shown in Fig. 5, so that no undue bending stresses are imposed upon the sections. This is a highly desirable condition inasmuch as the greater expansion of the chuck is generally necessitated because of the application of the chuck to a larger and hence heavier roll. The greater the weight imposed on the chuck, therefore, the more ideal the supporting conditions should be, and this condition is satisfied by the construction herein described. If, on the other hand, the roll is collapsed below the ideal three-point suspension position, the pressure is transmitted mainly by ribs 50 and 52 which might tend to impose bending stresses on the sections. It may be noted, however, that in this collapsed condition, particularly as shown in Fig. 7, a greater area of the cam surface 46 is in contact with the cam surfaces 48 of the sections, and that the amount of overhang beyond the region of contact between the cam surfaces 46 and 48 is thus relatively small. The amount of overhang of rib 50 will, of course, remain constant, but the overhang of rib 52 will vary and may disappear entirely as shown in Fig. 7. Thus, again, support is provided by the present construction where such support is needed.

It may be observed that with dual cams sliding one upon the other, the total rise effected by such a combination for a given relative angular displacement of the cams is double that effected by a single cam of the same contour acting against a cylindrical surface.

To facilitate still further a more even distribution of stresses along the axis of mandrel 14, the longitudinal slot depicted in my aforesaid prior patent is extended from end to end of the mandrel rather than terminating short of the flanged part thereof. One of the walls of the slot is shown in Fig. 2 at 53, and both walls 53 and 54 are shown in end elevation in Figs. 5 and 7. The presence of this slot makes it possible to deform the entire length of mandrel 14 to enable it to assume a uniform diameter throughout its entire length, or to provide uniform flexibility from end to end thereof and thus to insure uniform radial pressure upon the sections 18.

After the chuck has been expanded within the central opening 11 of a roll 10 to the point where the desired gripping effect is obtained, it may be locked in that position by the aforementioned set screw 33, the bottom of which presses against the outer surface 55 of a steel strap 56 welded to the exterior of a spiral cam 57 formed on the exterior of flange 20 of mandrel 14. The rise of cam 57 is such that set screw 33 will be wedged more firmly against flange 20 of mandrel 14 upon any relative movement between the mandrel and sleeve 17 in a direction to collapse the mandrel. It may be noted that cam 57 provides an infinite number of angular positions of the mandrel 14 relative to the sleeve 17 within the limits of slot 31 and hence any permitted degree of expansion necessary or desirable for the proper functioning of the chuck may be obtained.

In some instances, the central opening 11 of a roll may be formed with a recess at one end of the roll inwhich is received a driving lug 58, preferably made of a hard material such as Stellite, the inner end of which rests in a socket or recess 59 formed at the head end of the central rib 51 of each section 18 of the sleeve 17. One such driving lug 58 is sufficient for the chuck but for the sake of uniformity and interchangeability of the sections 18, each section is made with a recess 59 and is identical with every other section.

The application of the chuck of the present invention to a roll is accomplished in substantially the same manner as the application of my aforementioned chuck in that the chuck is first slipped over shaft 12, clamping screw 42 at the time being backed off so that the chuck is loose on shaft 12. The chuck is then slid into opening 11 until head 16 abuts the end of roll 10, and set screw 42 of the head is tightened to bring lugs 40 and 41 together and thereby to clamp the chuck to mandrel 12. Bar 23 is applied to opening 22 in lug 21, and mandrel 14 is rotated relative to sleeve 17 until further rotation, using ordinary force on bar 23, can no longer take place. The mandrel is locked to head 16 by screw 33 and the roll is ready for use.

It is understood that the foregoing description is merely illustrative of a preferred embodiment of the invention and that the scope of the invention therefore is not to be limited thereto, but is to be determined by the appended claims.

I claim:

1. An expansible chuck comprising a mandrel, a longitudinally split sleeve comprised of a plurality of axially extending tubular sections surrounding the mandrel, means for establishing relative rotation between the sleeve and mandrel, radially inwardly extending cams on the interior surfaces of the sections of the sleeve, radially outwardly extending cams on the mandrel in contact with the cams on the interior surfaces of the sections of the sleeve, said cams on the mandrel extending partly below and partly above the outer surface of the mandrel, said cams upon the establishment of relative rotation between the sleeve and mandrel sliding upon one another to alter the effective diameter of the sleeve, and means for limiting movement of the sleeve sections to a radial movement relative to the mandrel.

2. An expansible chuck comprising a mandrel, a longitudinally split sleeve comprised of a plurality of substantially identical axially extending tubular sections surrounding the mandrel, means for establishing relative rotation between the sleeve and mandrel, radially inwardly extending cams on the interior surfaces of the sections of the sleeve, radially outwardly extending cams on the mandrel in contact with the cams on the interior surfaces of the sections of the sleeve, said cams on the mandrel extending partly below and partly above the outer surface of the mandrel, all of said cams being disposed in a circumferential direction and defining segments of spiral surfaces, and means for limiting movement of the sleeve sections to a radial movement relative to the mandrel.

3. An expansible chuck comprising a mandrel, a head for supporting the mandrel and from which the mandrel extends, a plurality of substantially identical tubular sections extending axially from said head and overlying the mandrel, a radially disposed lug on each section, a radially disposed groove on the head for each lug and adapted to receive the lug for radial movement therein, interlocking relatively radially slidable means on the head and sections preventing relative axial movement between the head and sections, radially inwardly extending cams on the interior surfaces of the sections, radially outwardly extending cams on the mandrel, said cams on the mandrel extending partly below and partly above the outer surface of the mandrel, and means for establishing relative rotation between the sections and mandrel, said cams, upon the establishment of relative rotation between the sleeve and mandrel, sliding upon one another to alter the effective diameter of the sleeve.

4. An expansible chuck as described in claim 3, said mandrel being slotted along its entire length whereby to provide uniform pressure upon the sections throughout their length.

5. An expansible chuck as described in claim 3, said interlocking relatively radially slidable means on the head and sections comprising lugs on each section adjacent the radially disposed lugs and said head being formed with recesses to receive the said lugs adjacent the radially disposed lugs.

6. An expansible chuck comprising a mandrel, a longitudinally split sleeve comprised of a plurality of axially extending sections surrounding the mandrel, a head, means on the head for establishing relative rotation between the sleeve and mandrel, cam means interposed between the sleeve and mandrel and adapted to establish relative radial movement between the sleeve and mandrel upon the rotation of the mandrel relative to the sleeve, and means for locking the sleeve and mandrel in a relatively rotated condition, said means including a radially outwardly spiralled cam surface disposed to present a progressively smaller radial dimension to a fixed point on the head as the chuck is expanded, and means for locking the head to the cam surface.

7. An expansible chuck as described in claim 6, said locking means comprising a radially disposed set screw adapted to bear against the said cam surface.

8. An expansible chuck comprising a mandrel slotted longitudinally for substantially uniform radial resilience along the axis thereof, a head for supporting the mandrel and from which the mandrel extends, a longitudinally split sleeve comprised of a plurality of sections extending axially from the head and overlying the mandrel, a radially disposed lug on each section, a radially disposed groove on the head for each lug and adapted to receive the lug for radial movement therein, means on the head for establishing relative rotation between the sleeve and mandrel, radially inwardly extending cams on the interior surfaces of the sections of the sleeve, radially outwardly extending cams on the mandrel in contact with the cams on the interior surfaces of the sections of the sleeve, all of said cams being disposed in a circumferential direction relative to the mandrel and defining segments of spiral surfaces, and means for locking the sleeve and mandrel in a relatively rotated condition, said locking means including a radially outwardly spiralled cam surface on the mandrel disposed to present a progressively smaller radial dimension to a fixed point on the head as the chuck is expanded, and means for locking the head to the cam surface.

9. An expansible chuck as described in claim 8, and radially slidable interlocking means between the head and sections whereby to prevent axial separation of the head and sections.

References Cited in the file of this patent

UNITED STATES PATENTS 2,116,243    Johnson ---------------- May 3, 1938